United States Patent
Inata

(10) Patent No.: US 11,958,274 B2
(45) Date of Patent: Apr. 16, 2024

(54) CURABLE COMPOSITION FOR POLYMER ELECTROLYTE, AND LAYERED BODY

(71) Applicant: TOAGOSEI CO., LTD., Tokyo (JP)

(72) Inventor: Kazumasa Inata, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 831 days.

(21) Appl. No.: 16/978,217

(22) PCT Filed: Mar. 6, 2019

(86) PCT No.: PCT/JP2019/008973
§ 371 (c)(1),
(2) Date: Sep. 4, 2020

(87) PCT Pub. No.: WO2019/172347
PCT Pub. Date: Sep. 12, 2019

(65) Prior Publication Data
US 2021/0008859 A1     Jan. 14, 2021

(30) Foreign Application Priority Data

Mar. 7, 2018   (JP) ................................ 2018-041280
Nov. 22, 2018  (JP) ................................ 2018-218804

(51) Int. Cl.
| | | |
|---|---|---|
| B32B 27/30 | (2006.01) | |
| C08F 290/00 | (2006.01) | |
| C08L 63/08 | (2006.01) | |
| H01M 8/0284 | (2016.01) | |
| H01M 10/0565 | (2010.01) | |
| B82Y 40/00 | (2011.01) | |

(52) U.S. Cl.
CPC .......... *B32B 27/308* (2013.01); *C08F 290/00* (2013.01); *C08L 63/08* (2013.01); *H01M 8/0284* (2013.01); *H01M 10/0565* (2013.01); *B82Y 40/00* (2013.01); *H01M 2300/0025* (2013.01)

(58) Field of Classification Search
CPC ...... B32B 27/308; C08F 290/00; C08L 63/08; H01M 8/0284; H01M 10/0565; H01M 2300/0025; B82Y 40/00
See application file for complete search history.

(56) References Cited

FOREIGN PATENT DOCUMENTS

| | | | |
|---|---|---|---|
| CA | 3033168 | * | 3/2018 |
| CN | 1029447395 | * | 2/2013 |
| JP | 2001-207033 | | 7/2001 |
| JP | 2004-176014 | | 6/2004 |
| JP | 2017-219565 | | 12/2007 |
| JP | 2009-245797 | | 10/2009 |
| JP | 2012-001648 | | 1/2012 |
| JP | 2013-049765 | | 3/2013 |
| JP | 2013-144749 | | 7/2013 |
| JP | 2017-122164 | | 7/2017 |
| JP | 2017219565 | * | 12/2017 |
| WO | WO 2013035265 | * | 3/2013 |

OTHER PUBLICATIONS

JP 2017219565MT (Year: 2017).*
CN 1029447395 MT (Year: 2013).*
Decision to grant a Patent issued by JPO (Year: 2023).*
Notification to grant a Patent issued by SIPO (Year: 2023).*
PCT International Search Report (w/ English Translation) and Written Opinion for corresponding PCT Application No. PCT/JP2019/00873, dated May 21, 2019, 7 pages.

* cited by examiner

Primary Examiner — Alexander Usyatinsky
(74) Attorney, Agent, or Firm — Dority & Manning, PA

(57) ABSTRACT

Provided is a curable composition for a polymer electrolyte, including: a component (A): a radical polymerizable compound having a (meth)acryloyl group, a component (B): a compound having, in one molecule, an epoxy group and a skeleton of at least one selected from the group consisting of polybutadiene, polyisoprene, hydrogenated polybutadiene, and hydrogenated polyisoprene, and a component (C): a radical polymerization initiator, in which a content of each of the components (A) to (C) based on the entire composition is as follows, the component (A): from 30 to 98.9% by mass
the component (B): from 1 to 40% by mass, and
the component (C): from 0.1 to 15% by mass.

10 Claims, No Drawings

CURABLE COMPOSITION FOR POLYMER ELECTROLYTE, AND LAYERED BODY

TECHNICAL FIELD

The present invention relates to a curable composition for a polymer electrolyte, and a layered body. In particular, the present invention relates to a curable composition for a polymer electrolyte, the curable composition being used for an adhesive or a sealant for a fuel cell.

BACKGROUND ART

Fuel cells are power generation systems for direct conversion of chemical energy to electric energy, and thus are higher in theoretically achievable energy conversion efficiency than internal-combustion engines. Among fuel cells, solid polymer fuel cells can be reduced in terms of size and weight, and thus are intensively studied about actual introduction thereof into automobile applications.

Examples of advantages of fuel cell vehicles over conventional internal-combustion engine vehicles include a high energy conversion efficiency, exhaust gas being water vapor and clean because of use of hydrogen as fuel, and contribution ability to save petroleum resources because of various usable energies as energies for production of hydrogen. Fuel cell vehicles are also more advantageous in terms of cruising distance or energy supplement time (charge or hydrogen till-up) than electric automobiles of which energy sources are storage batteries such as lithium ion secondary batteries.

There has been recently, mainly in Europe, not only a move afoot to put restrictions on $CO_2$ emissions per travel distance, but also a move afoot to try to restrict internal-combustion engine vehicles themselves. Such moves have effects on the nations, and a move afoot to try to electrificate automobiles has been increasingly highly activated. Therefore, fuel cell vehicles have also been much expected as in electric automobiles in which lithium ion batteries or the like are installed.

While fuel cell vehicles are tried to be really put to practical use there is a need for a technique for more inexpensively and reliably producing a fuel cell than ever before. In various studies therefor, an adhesion technique is demanded which includes allowing a polymer electrolyte membrane (in particular, a perfluorocarbon material having a sulfonic acid group, such as Nafion (registered trademark) manufactured by Du Pont) to adhere, in a short time, to another substrate (for example, a heat-resistant polymer or a metal) in a solid polymer fuel cell, and which is excellent in terms of reliability, such as water resistance.

One known short-time adhesion technique is an adhesion technique using a photocurable composition.

Patent Document 1 discloses an example of use of an ultraviolet ray curable resin in production of a solid polymer fuel cell. However, Patent Document 1 neither discloses nor suggests what compound the ultraviolet ray curable resin is and whether or not it is a composition including other component(s) at all, and also neither discloses nor suggests properties such as curability and reliability at all.

A (meth)acrylate having a skeleton of polybutadiene, polyisoprene, hydrogenated polybutadiene, hydrogenated polyisoprene, or the like that is excellent in terms of water resistance is known as a photocurable compound for use in a radical curable-type of photocurable composition, and Patent Documents 2 to 4 each disclose a photocurable composition that includes such a (meth)acrylate, such as an adhesive or a sealant.

However, none of these Patent Documents discloses or suggests any application of the photocurable composition to a solid polymer fuel cell or a polymer electrolyte at all.

Recently, Patent Document 5 discloses, regarding a sealant for a solid polymer fuel cell, a radical curable-type of photocurable composition which is excellent in terms of curability and hydrolysis resistance, the composition containing a polymerization initiator and a polyfunctional (meth)acrylate compound that has no hydrolyzable bond in a main chain.

Polymer electrolytes have been progressively applied to various new applications other than fuel cell applications. Examples thereof include not only medical appliances, or actuators that are worn on human body, but also various sensors such as medical sensors or gas sensors. A technique for adhesion of a polymer electrolyte to another substrate in a short time is useful also in these fields.

CITATION LIST

Patent Documents

Patent Document 1: Japanese Patent Application Laid-Open (JP-A) No. 2009-245797
Patent Document 2: JP-A No. 2012-1648
Patent Document 3: JP-A No. 2013-49765
Patent Document 4: JP-A No. 2013-144749
Patent Document 5: JP-A No. 2017-122164

SUMMARY OF INVENTION

Technical Problem

However, the radical curable sealant for a solid polymer fuel cell described in Patent Document 5, although excellent in terms of curability and hydrolysis resistance, is not understood in terms of adhesiveness to a polymer electrolyte membrane and reliability (for example, no peeling even in immersion in hot water) in its adhesion state.

The present invention has been made in view of the problems above, and an object thereof is to provide a curable composition for a polymer electrolyte, which enables a polymer electrolyte to strongly adhere to another substrate such as a heat-resistant polymer in a short time, and is excellent in terms of reliability (in particular, no peeling even in immersion in hot water is important, and is hereinafter referred to as "hot water immersion resistance") in its adhesion state, as well as to provide a layered body.

Solution to Problem

The present inventor has made intensive studies in order to solve the problems above and, as a result, has found that the problems above are solved by a curable composition for a polymer electrolyte, including a radical polymerizable compound (hereinafter, referred to as "component (A)") having a (meth)acryloyl group, a compound (hereinafter, referred to as "component (B)") having, in one molecule, an epoxy group and a skeleton of at least one selected from the group consisting of polybutadiene, polyisoprene, hydrogenated polybutadiene, and hydrogenated polyisoprene, and a radical polymerization initiator (hereinafter, referred to as "component (C)") at a specified ratio, as well as by a layered body, and thus has completed the present invention.

The present invention is as follows.

[1] A curable composition for a polymer electrolyte, including the component (A), the component (B), and the component (C), in which a content of each of the components (A) to (C) based on the entire composition is as follows,
the component (A): from 30 to 98.9% by mass
the component (B): from 1 to 40% by mass, and
the component (C): from 0.1 to 15% by mass,

[2] The curable composition for a polymer electrolyte according to [1], in which: the component (A) includes a component (a1): a compound having, in one molecule, a (meth)acryloyl group and a skeleton of at least one selected from the group consisting of polybutadiene, polyisoprene, hydrogenated polybutadiene, and hydrogenated polyisoprene, and a content of the component (a1) based on the entire component (A) is from 20 to 100% by mass.

[3] The curable composition for a polymer electrolyte according to [2], in which the component (a1) includes a compound having a urethane bond in a molecule.

[4] The curable composition for a polymer electrolyte according to any one of [1] to [3], in which: the component (A) includes a component (a2): a monofunctional (meth)acrylate having a hydroxyl group, and a content of the component (a2) based on the entire component (A) is 20% by mass or less.

[5] The curable composition for a polymer electrolyte according to [4], in which: the component (A) further includes a component (a3): a monofunctional (meth)acrylate having a ring structure, provided that the component (a2) is excluded, and a content of each of the components (a1) to (a3) based on the entire component (A) is as follows,
the component (a1): from 20 to 94% by mass
the component (a2): from 1 to 20% by mass, and
the component (a3): from 5 to 70% by mass.

[6] The curable composition for a polymer electrolyte according to any one of [1] to [5], in which the component (C) includes a component (c1): a photoradical polymerization initiator.

[7] The curable composition for a polymer electrolyte according to any one of [1] to [6], further including a component (D): fine particles having a volume average primary particle size of from 0.1 to 100 μm, as measured by a wet method, in which a content of the component (D) based on the entire composition is from 1 to 60% by mass.

[8] The curable composition for a polymer electrolyte according to [7], in which the component (D) includes polymer fine particles.

[9] The curable composition for a polymer electrolyte according to any one of [1] to [8], the curable composition being used as an adhesive or sealant for a fuel cell.

[10] A layered body including a substrate, a cured product that is formed from the curable composition for a polymer electrolyte according to any one of [1] to [9], and another substrate, in which at least one of the substrate or the other substrate is a polymer electrolyte.

Advantageous Effects of Invention

The curable composition for a polymer electrolyte of the present invention enables a polymer electrolyte to strongly adhere to another substrate such as a heat-resistant polymer in a short time. The curable composition also enables its hot water immersion resistance to be excellent.

DESCRIPTION OF EMBODIMENTS

Hereinafter, various embodiments of techniques disclosed herein will be specifically described.

Herein, an acrylate and/or a methacrylate are collectively referred to as a (meth)acrylate, an acryloyl group and/or a methacryloyl group are collectively referred to as a (meth)acryloyl group, and an acrylic acid and/or a methacrylic acid are collectively referred to as a (meth)acrylic acid. Also, a compound having one (meth)acryloyl group is referred to as a monofunctional (meth)acrylate, and a compound having two or more (meth)acryloyl groups is referred to as a polyfunctional (meth)acrylate.

The present invention relates to a curable composition for a polymer electrolyte, including the component (A), the component (B), and the component (C), in which a content of each of the components (A) to (C) based on the entire composition is as follows,
the component (A): from 30 to 98.9% by mass
the component (B): from 1 to 40% by mass, and
the component (C): from 0.1 to 15% by mass.

Hereinafter, the component (A) to component (C), other components, the curable composition for a polymer electrolyte, a usage method, and a layered body and a method of producing the same will be specifically described.

1. Component (A)

The component (A) is a radical polymerizable compound having a (meth)acryloyl group.

The content of the component (A) based on the entire composition is from 30 to 98.9% by mass, and preferably from 40 to 90% by mass. When the component (A) is included in the range, curability of the composition is favorable. Also, a cured product of the composition is excellent in terms of adhesiveness to a polymer electrolyte, and hot water immersion resistance.

The component (A) that is used can be any of various compounds as long as they are compounds each having a (meth)acryloyl group.

Examples of the component (A) include, among compounds each having a (meth)acryloyl group, the following component (a1) to component (a5).

Component (a1): a compound having, in one molecule, one or more (meth)acryloyl groups and a skeleton of at least one selected from the group consisting of polybutadiene, polyisoprene, hydrogenated polybutadiene, and hydrogenated polyisoprene.

Component (a2): a monofunctional (meth)acrylate having a hydroxyl group.

Component (a3): a monofunctional (meth)acrylate having a ring structure, provided that the component (a2) is excluded.

Component (a4): an alkyl (meth)acrylate having an alkyl group that has 8 or more carbon atoms.

Component (a5): a compound having a (meth)acryloyl group, other than the component (a1) to component (a4).

Each of the component (a1) to component (a5) may be used singly, or in combination of two or more kinds thereof.

Hereinafter, the component (a1) to component (a5) will be described.

1-1. Component (a1)

The component (a1) is a compound having, in one molecule, one or more (meth)acryloyl groups and a skeleton (hereinafter, referred to as "polydiene-based skeleton") of at least one selected from the group consisting of polybutadiene, polyisoprene, hydrogenated polybutadiene, and hydrogenated polyisoprene The number of (meth)acryloyl groups in one molecule is preferably two from the viewpoint of an excellent adhesiveness to various materials.

In the component (a1), the molecular weight of the polydiene-based skeleton, namely, the molecular weight of a compound having the polydiene-based skeleton as a raw material compound of the component (a1) is preferably from 500 to 5,000, more preferably from 500 to 4,000, and still more preferably from 700 to 3,000 in terms of number average molecular weight (hereinafter, referred to as "Mn"), from the viewpoints that solubility in the composition is excellent and that a resulting cured product of the composition is excellent in terms of adhesiveness and hot water immersion resistance.

Examples of the compound having a polydiene-based skeleton include a compound [hereinafter, referred to as "polydiene-based alcohol"] having a polydiene-based skeleton and one or more hydroxyl groups, a compound having a polydiene-based skeleton and an epoxy group, a compound having a polythene-based skeleton and a carboxyl group, and a compound having a polythene skeleton and a carboxylic anhydride, each of which is a raw material compound of components (a1-1) to (a1-6) described below.

In the present invention, the Mn (number average molecular weight) means a value obtained by converting the molecular weight measured by gel permeation chromatography (hereinafter, referred to as "GPC") with reference to polystyrene.

The molecular weight of the component (a1), in terms of Mn, is preferably from 1,000 to 100,000, more preferably from 3,000 to 80,000, and still more preferably from 5,000 to 60,000. When the Mn of the component (a1) is 1,000 or more, a resulting cured product of the composition can be excellent in terms of adhesiveness and hot water immersion resistance. When the Mn is 100,000 or less, solubility in the composition can be excellent.

In a case in which the composition is used as a photocurable composition, the (meth)acryloyl group is preferably an acryloyl group because curability of the composition is excellent.

Examples of the component (a1) include e following component (a1-1) to component (a1-6).

Component (a1-1): a urethanization reaction product of a polydiene-based alcohol, a polyisocyanate, and a (meth)acrylate having a hydroxyl group.

Component (a1-2): an addition reaction product of a compound having an isocyanate group and a (meth)acryloyl group, to a polydiene-based alcohol.

Component (a1-3): a (meth)acrylate of a polydiene-based alcohol.

Component (a1-4): an adduct of a (meth)acrylic acid to a compound having a polydiene-based skeleton and an epoxy group.

Component (a1-5): an adduct of a (meth)acrylate having an epoxy group, to a compound having a polydiene-based skeleton and a carboxyl.

Component (a1-6): an adduct of a (meth)acrylate having a hydroxyl group, to a compound having a polydiene skeleton and a carboxylic anhydride.

Examples of the method of producing the component (a1-2) include a method of performing dehydration esterification reaction of a polydiene-based alcohol and a (meth)acrylic acid under presence of an acid catalyst, and a method of performing transesterification of a polydiene-based alcohol and a low-molecular weight (meth)acrylate:

The component (a1) preferably contains a compound (hereinafter, referred to as "polydiene-based urethane (meth)acrylate") having a urethane bond in a molecule, from the viewpoint that an adhesiveness to various substrates is excellent.

The polydiene-based urethane (meth)acrylate is preferably the component (a1-1) described above.

A particularly preferable component (a1-1) is a urethane (meth)acrylate obtained by urethanization reaction of a polydiene-based diol, a diisocyanate, and a compound that includes a hydroxyl group and a (meth)acryloyl group, from the viewpoint that an adhesiveness to various substrates is excellent.

Hereinafter, the polydiene diol, the diisocyanate, and the compound that includes a hydroxyl group and a (meth)acryloyl group, which are raw material compounds of the preferable component (a1-1), will be described.

Examples of the polydiene diol include polybutadiene diol, polyisoprene diol, and diol of a butadiene-styrene copolymer. Examples of a hydrogenated polydiene diol include a hydrogenated polybutadiene diol a hydrogenated polyisoprene diol, and a hydrogenated product of a diol of a butadiene-styrene copolymer.

The Mn of the polydiene diol is preferably from 500 to 5,000, and more preferably from 1,000 to 4.000. As described above, a polydiene diol satisfying the Mn range has excellent solubility in the composition and enables a resulting cured product of the composition to be excellent in terms of adhesiveness and hot water immersion resistance.

Examples of the diisocyanate can include an aliphatic diisocyanate such as hexamethylene diisocyanate, an alicyclic diisocyanate such as isophorone diisocyanate, hydrogenated tolylene diisocyanate, hydrogenated diphenylmethane diisocyanate, or hydrogenated xylylene diisocyanate, and an aromatic diisocyanate such as tolylene diisocyanate, diphenylmethane diisocyanate, tolidine diisocyanate, naphthalene diisocyanate, or xylylene diisocyanate.

Examples of the compound that includes a hydroxyl group and a (meth)acryloyl group include 2-hydroxyethyl (meth)acrylate, 2-hydroxypropyl (meth)acrylate, 4-hydroxybutyl (meth)acrylate, a caprolactone modified product of 2-hydroxyethyl (meth)acrylate, and glycidol di(meth) acrylate.

Among these compounds, a hydroxyalkyl (meth)acrylate such as 2-hydroxyethyl (meth)acrylate, 2-hydroxypropyl (meth)acrylate, or 4-hydroxybutyl (meth)acrylate is preferable.

Examples of a method of producing the preferable component (a1-1) include a method (hereinafter, referred to as "production method 1") that includes carrying out a reaction of a polydiene-based diol and a diisocyanate to produce a urethane prepolymer that has an isocyanate group, and carrying out a reaction of the prepolymer and a compound that has a hydroxyl group and a (meth)acryloyl group, and a method (hereinafter, referred to as "production method 2") that includes carrying out a reaction of a polydiene-based diol a diisocyanate, and a compound that has a hydroxyl group and a (meth)acryloyl group.

In the present invention, a polydiene-based urethane meth)acrylate obtained by the production method 1 is preferable, from the viewpoints that the molecular weight is easily controlled, the resulting polydiene-based urethane (meth)acrylate is excellent in terms of solubility in other components, and the resulting composition is excellent in terms of adhesiveness.

The molar ratio between the poly diene-based diol and the diisocyanate in production of the preferable component (a1-1) is preferably from 1:2.2 to 1:1.05, more preferably from 1:2 to 1:1.1, and still more preferably from 1:1.8 to 1:1.1. A component (a1-1) obtained by reaction at the ratio has excellent solubility in other (meth)acrylates, and enables a cured product of the resulting composition to be excellent in terms of adhesiveness.

The content of the component (a1) based on the entire component (A) is preferably from 20 to 100% by mass, more preferably from 20 to 94% by mass, and still more preferably from 30 to 80% by mass, from the viewpoint that a cured product of the composition is excellent in terms of adhesiveness and hot water immersion resistance.

1-2. Component (a2)

The component (a2) is a monofunctional (meth)acrylate having a hydroxyl group.

The component (a2) enables a cured product of the composition to be excellent in terms of adhesiveness to a polymer electrolyte, and thus is a preferable component as the component (A).

Specific examples of the component (a2) include 2-hydroxyethyl (meth)acrylate, 2-hydroxypropyl (meth)acrylate, 3-hydroxypropyl (meth)acrylate, 4-hydroxybutyl (meth)acrylate, 2-hydroxybutyl (meth)acrylate, 2-hydroxy-3-phenoxypropyl (meth)acrylate, 1,4-cyclohexanedimethanol mono(meth)acrylate, polyethylene glycol mono(meth)acrylate, polypropylene glycol mono(meth)acrylate, polytetramethylene glycol mono(meth)acrylate, and 2-(meth)acryloyloxyethyl-2-hydroxypropyl phthalate.

The content of the component (a2) based on the entire component (A) is preferably 20% by mass or less, from the viewpoint that a cured product of the composition can be particularly excellent in terms of hot water immersion resistance, and is more preferably from 1 to 20% by mass, from the viewpoint that a cured product of the composition can have both adhesiveness and hot water immersion resistance.

1-3. Component (a3)

The component (a3) is a monofunctional (meth)acrylate having a ring structure, provided that the component (a2) is excluded.

The component (a3) enables a cured product of the composition to be enhanced in terms of toughness or heat resistance, enhanced in terms of adhesiveness to a polymer electrolyte or various materials, or enhanced in terms of hot water immersion resistance, and is thus a preferable component as the component (A).

Examples of the ring structure in the component (a3) include an alicyclic ring, an aromatic ring, and a heterocyclic ring.

Specific examples of the component (a3) include the following compounds.

Examples of a monofunctional (meth)acrylate having an alicyclic ring include cyclohexyl (meth)acrylate, isobornyl (meth)acrylate, dicyclopentenyl (meth)acrylate, dicyclopentanyl (meth)acrylate, dicyclopentenyloxyethyl (meth)acrylate, 4-tert-butyl cyclohexyl (meth)acrylate, and 1-adamantyl (meth)acrylate.

Examples of a monofunctional (meth)acrylate having an aromatic ring include benzyl (meth)acrylate, phenyl (meth)acrylate, a (meth)acrylate of an alkylene oxide adduct of phenol, a (meth)acrylate of an alkylene oxide adduct of nonylphenol, a (meth)acrylate of an alkylene oxide adduct of phenoxyphenol, a (meth)acrylate of an alkylene oxide adduct of p-cumylphenol, and a (meth)acrylate of an alkylene oxide adduct of o-phenylphenol.

Examples of a monofunctional (meth)acrylate having a heterocyclic ring include tetrahydrofurfuryl (meth)acrylate, glycidyl (meth)acrylate, 3-ethyl-3-oxetanyl (meth)acrylate, (2-methyl-2-ethyl-1,3-dioxolan-4-yl)methyl (meth)acrylate, a cyclic trimethylolpropane formal (meth)acrylate, 2-(meth)acryloyloxyethyl hexahydrophthalic acid, N-(meth)acryloyloxyethyl hexahydrophthalimide, and N-(meth)acryloyloxyethyl tetrahydrophthalimide.

Examples of the alkylene oxide in the alkylene oxide adduct include ethylene oxide and propylene oxide.

The content of the component (a3) based on the entire component (A) is preferably from 5 to 70% by mass, and more preferably from 10 to 60% by mass. Satisfying this range enables a cured product of the composition to be enhanced in terms of toughness or heat resistance, enables the composition to be enhanced in terms of adhesiveness to a polymer electrolyte or various materials, or enables the composition to be enhanced in terms of hot water immersion resistance.

1-4 Component (a4)

The component (a4) is an alkyl (meth)acrylate having an alkyl group that has 8 or more carbon atoms.

The component (a4) is used for the purpose of enhancement of a cured product of the composition in terms of flexibility or peeling strength to various materials.

Specific examples of the component (a4) include 2-ethylhexyl (meth)acrylate, n-octyl (meth)acrylate, isooctyl (meth)acrylate, n-nonyl (meth)acrylate, isononyl (meth)acrylate, isodecyl (meth)acrylate, lauryl (meth)acrylate, stearyl (meth)acrylate, and isostearyl (meth)acrylate.

The content of the component (a4) based on the entire component (A) is preferably less than 10% by mass for particularly enhancing adhesiveness to a polymer electrolyte.

1-5. Component (a5)

The component (a5) is a compound having a (meth)acryloyl group, other than the component (a1) to component (a4), and various compounds can be used therefor.

The component (a5) is preferably a compound having one or two (meth)acryloyl groups in one molecule, and is preferably a compound having one (meth)acryloyl group in one molecule for the purpose of enhancement in terms of adhesiveness to hardly adhesive materials.

A compound having three or more (meth)acryloyl groups in one molecule may also be used for the purpose of enhancement in terms of curability of the composition or enhancement in terms of hardness of a cured product. However, for the purpose of enhancement in terms of adhesiveness to hardly adhesive materials, the content of the compound based on the entire component (A) is preferably 20% by mass or less, more preferably 10% by mass or less, and, particularly preferably, the compound is not contained.

Specific examples of the compound having one (meth)acryloyl group in one molecule include n-butoxyethyl (meth)acrylate, ethylcarhitol (meth)acrylate, methoxypolyethylene glycol (meth)acrylate, methoxypolypropylene glycol (meth)acrylate, 2,2,3,3-tetrafluoropropyl (meth)acrylate, 1H,1H,5H-octafluoropentyl(meth)acrylate, (meth)acrylic acid, 2-(meth)acryloyloxyethyl succinic acid, 2-(meth)acryloyloxyethyl acid phosphate, acrylamide, N,N-dimethyl) acrylamide, N,N-diethyl (meth)acrylamide, N-isopropyl (meth)acrylamide, N-hydroxyethyl (meth)acrylamide, (meth)acryloylmorpholine, N,N-dimethylaminopropyl (meth)acrylamide, and (3-(meth)acryloyloxypropyl) trimethoxysilane.

Specific examples of the compound having two (meth)acryloyl groups in one molecule include:
 a di(meth)acrylate of an aliphatic diol, such as ethylene glycol di(meth)acrylate, propylene glycol di(meth)acrylate, 1,4-butanediol di(meth)acrylate, neopentylglycol di(meth)acrylate, 1,6-hexanediol di(meth)acrylate, 3-methyl-1,5-pentanediol di(meth)acrylate, 2-butyl-2-ethyl-1,3-propanediol di(meth)acrylate, or 1,9-nonanediol di(meth)acrylate;

a di(meth)acrylate of an alicyclic diol, such as cyclohexane dimethylol di(meth)acrylate or tricyclodecane dimethylol di(meth)acrylate;

a polyalkylene glycol di(meth)acrylate, such as diethylene glycol di(meth)acrylate, dipropylene glycol di(meth) acrylate, triethylene glycol di(meth)acrylate, or tripropylene glycol di(meth)acrylate;

an esterification reaction product of neopentylglycol, hydroxypivalic acid, and (meth)acrylic acid;

a fluorene-based di(meth)acrylate, such as 9,9-bis[4-(2-acryloyloxyethoxy)phenyl]fluorene;

a di(meth)acrylate of an alkylene oxide adduct of a bisphenol-based compound, such as a di(meth)acrylate of an alkylene oxide adduct of bisphenol A;

a di(meth)acrylate of a hydrogenated bisphenol-based compound, such as a di(meth)acrylate of hydrogenated bisphenol A;

an epoxy (meth)acrylate having two acryloyl groups in one molecule, such as an adduct of a bisphenol A type epoxy resin and (meth)acrylic acid, or an adduct of 1,9-nonanediol diglycidyl ether and (meth)acrylic acid;

a polyester (meth)acrylate having two (meth)acryloyl groups in one molecule, such as an esterified product of phthalic acid, ethylene glycol, and (meth)acrylic acid; and a urethane (meth)acrylate having two (meth)acryloyl groups in one molecule, such as a urethanization reaction product of isophorone diisocyanate and 2-hydroxyethyl (meth)acrylate, a urethanization reaction product of tolylene diisocyanate, a polyether diol, and 2-hydroxypropyl (meth)acrylate, a urethanization reaction product of hexamethylene diisocyanate, a polyester diol, and 2-hydroxybutyl (meth)acrylate, or a urethanization reaction product of isophorone diisocyanate, a polycarbonate diol, and 4-hydroxybutyl (meth)acrylate.

Examples of the alkylene oxide in the alkylene oxide adduct include ethylene oxide and propylene oxide.

Specific examples of the compound having three or more (meth)acryloyl groups in one molecule include:

a polyol poly(meth)acrylate, such as trimethylolpropane tri(meth)acrylate, ditrimethylolpropane tetra(meth) acrylate, pentaerythritol di, tri or tetra(meth)acrylate, dipentaerythritol penta or hexa(meth)acrylate, a tri (meth)acrylate of a 3 mol adduct of isocyanuric acid ethylene oxide, glycerol tri(meth)acrylate, or polyglycerol poly(meth)acrylate;

a poly(meth)acrylate of a polyol alkylene oxide adduct, such as a tri(meth)acrylate of a trimethylolpropane alkylene oxide adduct, a tetra(meth)acrylate of a ditrimethylolpropane alkylene oxide adduct, a tri- or tetra(meth)acrylate of a pentaerythritol alkylene oxide adduct, a penta or hexa(meth)acrylate of a dipentaerythritol alkylene oxide adduct, a tri(meth)acrylate of a glycerol alkylene oxide adduct, or a poly(meth) acrylate of a polyglycerol alkylene oxide adduct;

an epoxy (meth)acrylate having three or more (meth) acryloyl groups in one molecule, such as an adduct of a phenol-novolac type epoxy resin and (meth)acrylic acid, or an adduct of a cresol-novolac type epoxy resin and (meth)acrylic acid;

a urethane (meth)acrylate having three or more (meth) acryloyl groups in one molecule, such as a urethanization reaction product of isophorone diisocyanate and pentaerythritol tri(meth)acrylate, or a urethanization reaction product of 4-hydroxybutyl acrylate and an isocyanurate type trimer of hexamethylene diisocyanate;

a polyester (meth)acrylate having three or more (meth) acryloyl groups in one molecule, such as an esterified product of phthalic acid, trimethylolpropane, and (meth)acrylic acid, or a dendrimer type poly(meth) acrylate; and a polymer having a (meth)acryloyl group, such as a polymer obtained by adding glycidyl (meth)acrylate to a carboxylic acid of a (meth)acrylic polymer that contains a (meth)acrylic acid as a constituent unit, or a polymer obtained by adding (meth)acrylic acid to an epoxy group of a (meth)acrylic polymer that contains glycidyl (meth)acrylate as a constituent unit.

Examples of the alkylene oxide in the alkylene oxide adduct include ethylene oxide and propylene oxide.

1-6. Other Component (A)

In a case in which the composition of the present invention is used for a gas sensor, a fuel cell, or the like, a metal that is present on a surface of a polymer electrolyte, such as a platinum catalyst, may adsorb volatile components in the composition, resulting in deterioration in terms of performance. In order to solve this problem, it is preferable that the component (A) does not contain volatile (meth)acrylates in an amount of 5% by mass or more based on the entire composition.

Examples of the volatile (meth)acrylate include a (meth) acrylate that has no hydrogen-bonding group and has a molecular weight of 250 or less, and a (meth)acrylate that has a hydrogen-bonding group and has a molecular weight of 200 or less. Specific examples of the hydrogen-bonding group include a hydroxyl group, a carboxyl group, a sulfonic acid group, a phosphoric acid group, an imide group, and an amide group.

2. Component (B)

The component (B) in the present invention is a compound having a polydiene-based skeleton and an epoxy group.

The number of epoxy groups contained in one molecule is preferably two or more.

The content of the component (B) based on the entire composition is from 1 to 40% by mass, preferably from 1 to 30% by mass, and more preferably from 1 to 25% by mass. When the content of the component (B) is from 1 to 40% by mass, a cured product of the composition is excellent in terms of adhesiveness to a polymer electrolyte and hot water immersion resistance.

Specific examples of the component (B) include the following component (b1) to component (b4).

Component (b1): a compound obtained by epoxidizing a double bond of polybutadiene or polyisoprene.

Component (b2): a compound obtained by epoxidizing a double bond of polybutadiene or polyisoprene, and adding hydrogen to the remaining double bond.

Component (b3): an epoxy compound obtained by glycidyl-etherifying, with epichlorohydrin or the like, a hydroxyl group of a high-molecular weight compound that has a polydiene-based skeleton and has a hydroxyl group at each of both terminals.

Component (b4): a compound obtained by adding a compound that has two or more epoxy groups in one molecule, to a carboxyl group of a high-molecular weight compound that has a polydiene-based skeleton and has a carboxyl group at each of both terminals.

More specific examples of the component (b4) include a compound obtained by adding a bisphenol A type epoxy resin to a polybutadiene of which both terminals are each modified by a carboxyl group.

Among these compounds, the component (B) is preferably the component (b1) from the viewpoint that a cured product of the composition is excellent in terms of hot water immersion resistance.

The component (B) may be used singly, or in combination of two or more kinds thereof.

The molecular weight of the component (B), in terms of Mn, is preferably from 500 to 5,000, and more preferably from 500 to 3,000. When the Mn of the component (B) is 500 or more, adhesiveness to a polymer electrolyte can be enhanced. When the Mn is 5,000 or less, solubility in the composition can be favorable.

The ratio of epoxy group contained in the component (B), in terms of the oxirane oxygen concentration, is preferably from 1 to 20%, and more preferably from 3 to 15%. When the oxirane oxygen concentration of the component (B) is in a range of from 1 to 20%, an adhesion body with a polymer electrolyte can be improved in terms of hot water immersion resistance.

The oxirane oxygen concentration in the present invention refers to a value obtained by measurement according to ASTM D1652 (HBr titration).

3. Component (C)

The component (C) is a radical polymerization initiator, and various radical generators can be used therefor.

The content of the component (C) based on the entire composition is from 0.1 to 15% by mass, preferably from 0.2 to 13% by mass, and more preferably from 0.5 to 10% by mass. In a case in which the content of the component (C) is less than 0.1% by mass, curability of the composition is insufficient, and, on the contrary, in a case in which the content is more than 15% by mass, a cured product of the composition is deteriorated in terms of heat resistance, hot water immersion resistance, or the like.

Examples of the component (C) include a photoradical polymerization initiator (hereinafter, referred to as "component (c1)") which generates radicals by light, and a radical polymerization initiator (hereinafter, referred to as "component (c2)") other than the component (c1).

The composition of the present invention, which is in the form of a photocurable composition containing the component (c1), thus can be instantly cured, and can significantly contribute to improvement in terms of productivity.

Hereinafter, the component (c1) and the component (c2) will be sequentially described.

3-1. Component (c1)

The component (c1) is a photoradical polymerization initiator, and various compounds can be used therefor.

Specific examples of the component (c1) include:

an acetophenone-based compound, such as benzyl dimethyl ketal, 1-hydroxycyclohexylphenyl ketone, 2-hydroxy-2-methyl-1-phenylpropan-1-one, 1-[4-(2-hydroxyethoxy)phenyl]-2-hydroxy-2-methyl-1-propan-1-one, oligo[2-hydroxy-2-methyl-1-[4-1-(methylvinyl)phenyl]propanone, 2-hydroxy-1-[4-[4-(2-hydroxy-2-methyl-propionyl)benzyl]phenyl]-2-methylpropan-1-one, 2-methyl-1-[4-(methylthio)]phenyl]-2-morpholinopropan-1-one, 2-benzyl-2-dimethylamino-1-(4-morpholinophenyl)butan-1-one, 2-dimethylamino-2-(4-methylbenzyl)-1-(4-morpholin-4-yl-phenyl)butan-1-one, or 3,6-bis(2-methyl-2-morpholinopropionyl)-9-n-octylcarbazole;

a benzoin compound such as benzoin, benzoin ethyl ether, benzoin isopropyl ether, or benzoin isobutyl ether;

a benzophenone-based compound, such as benzophenone, 2-methylbenzophenone, 3-methylbenzophenone, 4-methyl-benzophenone, 2,4,6-trimethylbenzophenone, 4-phenylbenzophenone, methyl-2-benzophenone, 1-[4-(4-benzoylphenylsulfanyl)phenyl]-2-methyl-2-(4-methylphenylsulfonyl)propan-1-one, 4,4'-bis(dimethylamino)benzophenone, 4,4'-bis(diethylamino)benzophenone, or 4-methoxy-4'-dimethylaminobenzophenone;

an acylphosphine oxide compound, such as bis(2,4,6-trimethylbenzoyl)phenylphosphine oxide, 2,4,6-trimethylbenzoyldiphephenylphosphine oxide, or bis(2,6-dimethoxybenzoyl)-2,4,4-trimethylpentylphosphine oxide; and a thioxanthone-based compound, such as thioxanthone, 2-chlorothioxanthone, 2,4-diethyl thioxanthone, isopropyl thioxanthone, 1-chloro-4-propyl thioxanthone, 3-[3,4-dimethyl-9-oxo-9H-thioxanthone-2-yl-oxy]-2-hydroxypropyl-N,N,N-trimethylammonium chloride, or fluorothioxanthone.

Examples of compounds other than the above include benzil, ethyl (2,4,6-trimethylbenzoyl)phenylphosphinate, methyl phenylglyoxylate, ethyl anthraquinone, phenanthrenedione, and camphorquinone.

Among these compounds, the component (c1) preferably contains the acylphosphine oxide-based compound from the viewpoint that curability of the composition is excellent.

Several kinds of compounds selected from the acylphosphine oxide-based compound, the thioxanthone-based compound, and the α-aminoalkylphenone-based compound are preferably used in combination, for the purpose of improvement in terms of curability inside a cured product in a case in which the thickness of the cured product is required to be increased, for example, 50 μm or more, or for the purpose of improvement in terms of curability of the composition in a case in which an ultraviolet absorber or a pigment is used in combination.

Preferable examples of the compounds in the case above include:

as the acylphosphine oxide compound, bis(2,4,6-trimethylbenzoyl)phenylphosphine oxide, 2,4,6-trimethylbenzoyldiphenylphosphine oxide, ethyl-(2,4,6-trimethylbenzoyl)phenylphosphinate, and bis(2,6-dimethoxybenzoyl)-2,4,4-trimethylpentylphosphine oxide;

as the thioxanthone-based compound, 2,4-diethyl thioxanthone, isopropyl thioxanthone, and 1-chloro-4-propoxythioxanthone; and, as the α-aminoalkylphenone-based compound, 2-methyl-1-[4-(methylthio)]phenyl]-2-morpholinopropan-1-one, 2-benzyl-2-dimethylamino-1-(4-morpholinophenyl)butan-1-one, and 2-dimethylamino-2-(4-methylbenzyl)-1-(4-morpholin-4-yl-phenyl)-butan-1-one.

The component (c1) may be used singly, or in combination of two or more kinds thereof.

The content of the component (c1) based on the entire component (C) is preferably from 0.1 to 15% by mass, and more preferably from 0.5 to 10% by mass. When the content of the photoradical polymerization initiator is 0.1% by mass or more, the composition can be favorable in terms of photo-curability and can be excellent in terms of adhesiveness, and when the content is 15% by mass or less, a cured product can be favorable in terms of internal curability thereof and can be favorable in terms of adhesiveness to a substrate.

3-2. Component (c2)

The component (c2) is a radical polymerization initiator other than the component (c1), and a thermal radical polymerization initiator such as a peroxide or an azo-based compound can be used therefor. A redox type radical polymerization initiator can also be used therefor.

Specific examples of the organic peroxide include 1,1-bis (t-butylperoxy)2-methylcyclohexane, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)cyclohexane, 2,2-bis(4,4-di-butylperoxycyclohexyl)propane, 1,1-bis(t-butylperoxy)cyclododecane, t-hexylperoxyisopropyl monocarbonate, t-butylperoxymaleic acid, t-butylperoxy-3,5,5-trimethylhexanoate, t-butylperoxylaurate, 2,5-dimethyl-2,5-di(m-toluoylperoxy)hexane, t-butylperoxyisopropyl monocarbonate, t-butylperoxy 2-ethylhexyl monocarbonate, t-hexyl peroxybenzoate, 2,5-di-methyl-2,5-di(benzoylperoxy) hexane, t-butylperoxyacetate, 2,2-bis(t-butylperoxy)butane, t-butylperoxybenzoate, n-butyl-4,4-bis(t-butylperoxy)valerate, di-t-butylperoxyisophthalate, α,α'-bis(t-butylperoxy)diisopropylbenzene, dicumyl peroxide, 2,5-dimethyl-2,5-di(t-butylperoxy)hexane, t-butyl cumyl peroxide, di-t-butyl peroxide, p-menthane hydroperoxide, 2,5-dimethyl-2,5-di(t-butylperoxy)hexyne-3, diisopropylbenzene hydroperoxide, t-butyl trimethylsilyl peroxide, 1,1,3,3-tetramethylbutyl hydroperoxide, cumene hydroperoxide, t-hexyl hydroperoxide, and t-butyl hydroperoxide.

Specific examples of the azo-based compound include 1,1'-azobis(cyclohexane-1-carbonitrile), 2-(carbamoylazo) isobutyronitrile, 2-phenylazo-4-methoxy-2,4-dimethylvaleronitrile, azo di-t-octane, and azo di-t-butane.

The component (c2) may be used singly, or in combination of two or more kinds thereof. The organic peroxide can also be used as a redox initiator in combination with a reductant.

The content of the component (c2) based on the entire component (C) is preferably 10% by mass or less and more preferably 5% by mass or less, for the purpose of allowing the composition to be favorable in terms of curability and to be enhanced in terms of adhesiveness to a substrate. It is preferable that, under a condition in which light sufficiently reaches the composition, the component (c2) is not contained in consideration of storage stability of the composition.

In a case in which the component (c2) is used singly, curing may be carried out by usual thermal radical polymerization according to an ordinary procedure. In some cases, the component (c1) may be used in combination therewith to carry out photo curing, followed by carrying out thermal curing for the purpose of further improvement in terms of reaction rate.

4. Other Components

The curable composition for a polymer electrolyte of the present invention includes the component (A) to component (C) as essential components, and may further include various other components depending on the purpose.

The other component preferably includes fine particles (hereinafter, referred to as "component (D)").

Hereinafter, the component (D) and components other than the component (D) will be described.

4-1. Component (D)

The component (D) is fine particles.

The component (D) is preferably fine particles having a volume average primary particle size of from 0.1 to 100 µm. When the component (D) having the particle size is included, the thickness of an adhesion layer can be kept at a certain value or more even in a case in which a polymer electrolyte and another substrate are affixed and subjected to pressure application. Also, suitability for screen printing is also improved.

The component (D) is preferably insoluble in the component (A) to component (C).

Specific examples of the component (D) include inorganic fine particles and polymer fine particles.

Examples of the inorganic fine particles include alumina, silica, and zirconia.

Examples of the polymer fine particles include chemically crosslinked polymer fine particles, and non-crosslinked polymer fine particles insoluble in the component (A) to component (C). Examples of the non-crosslinked polymer fine particles include polyolefin, fluorinated polyolefin, and cellulose-based resins.

The component (D) may be used singly, or in combination of two or more kinds thereof.

In particular, the component (D) preferably contains polymer fine particles, more preferably contains chemically crosslinked polymer fine particles, from the viewpoint that dispersibility and its stability are excellent.

Specific examples of the chemically crosslinked polymer fine particles include acrylic fine particles including a polymerization unit of a (meth)acrylate monomer such as methyl methacrylate, and polyurethane-based fine particles.

Examples of the method of crosslinking the acrylic fine particles include a method including copolymerizing a monomer mixture that includes a monofunctional (meth) acrylate monomer and a bifunctional (meth)acrylate monomer, and a method including previously copolymerizing a monomer mixture that includes a meth)acrylate monomer having an alkoxysilyl group and a monofunctional (meth) acrylate monomer, and subjecting the alkoxysilyl group to hydrolysis and condensation to be crosslinked.

The volume average primary particle size of the component (D) is preferably from 0.1 to 100 µm, more preferably from 0.2 to 70 µm, still more preferably from 0.5 to 50 µm, and particularly preferably from 0.5 to 30 µm.

The volume average primary particle size of the component (D) means a value obtained by measurement with a laser diffraction scattering particle size distribution meter (wet method).

In a case in which the component (D) is included in the composition of the present invention, the content thereof based on the entire composition is preferably from 1 to 60% by mass, and more preferably from 5 to 50% by mass.

4-2. Components Other than Component (D)

Examples of components other than the component (D) include a polymerizable compound having no (meth)acryloyl group, particles (for example, fine particles having an average primary particle size of less than 0.1 µm and having a size of from some 10 nm to some nm) having a particle size that does not fall within the range of the component (D), a polymer (hereinafter, referred to as "other polymer") other than the component (A), the component (B), and the component (D), a tackifier, a plasticizer, a defoamer, a leveling agent, a polymerization inhibitor, a stabilizer, and an organic solvent.

Specific examples of the polymerizable compound having no (meth)acryloyl group include a compound having a vinyl ether group, such as N-vinylpyrrolidone, N-vinylcaprolactam, styrene, or polyethylene glycol divinyl ether, and a compound having a maleimide group, such as N-phenylmaleimide.

Examples of the fine particles having a particle size that does not fall within the range of the component (D) include fine particles (fumed silica or the like) which can be used for the purpose of imparting thixotropy during coating and which have an average primary particle size of less than 0.1 µm and have a size of from some 10 nm to some nm, and particles which can be used for the purpose of greatly increasing the thickness of a cured product or decreasing curing shrinkage rate and which have a particle size of from some 100 µm to some mm.

Specific examples of the other polymer preferably include a polymer which is an uncrosslinked polymer and is soluble in the composition.

Examples of the polymer include a (meth)acrylic resin, polystyrene, a styrene-acrylonitrile copolymer, polybutadiene, polyisoprene, polyisobutylene, a hydrogenated polybutadiene, a hydrogenated polyisoprene, a maleinated polybutadiene, a maleinated polyisoprene, a maleinated polypropylene, a chlorinated polypropylene, a petroleum resin, a hydrogenated petroleum resin, a xylene resin, polytetramethylene glycol, polyvinyl acetate, an ethylene-vinyl acetate copolymer, an ethylene-acrylic copolymer, a polyester, a polyamide, a polyurethane, and a polycarbonate.

The polymer may serve as a component for imparting adhesiveness, or may serve as a tackifier or a plasticizer described below.

Specific examples of the tackifier include a rosin ester.

Specific examples of the plasticizer include dioctyl phthalate.

Examples of the defoamer include hydrocarbon-based, silicone-based, fluorosilicone-based, fluorine-based, and mineral spirits-based defoamers, and those publically known can be used therefor.

Examples of the leveling agent include hydrocarbon-based, silicone-based, and fluorine-based leveling agents, and those publically known can be used therefor.

Examples of the polymerization inhibitor include hydroquinone and methoxyhydroquinone, and those publically known can be used therefor.

Examples of the stabilizer include a hindered phenol-based antioxidant, a sulfur-based antioxidant, a phosphorus-based antioxidant, a hindered amine-based antioxidant, and an ultraviolet absorber, and those publically known can be used therefor.

Those publically known can be used as the organic solvent, as long as they can dissolve the component (A) to component (C). However, no organic solvent is preferably included in consideration of reduction in terms of production efficiency due to a solvent drying step, and the remaining solvent.

5. Curable Composition for Polymer Electrolyte

The curable composition for a polymer electrolyte of the present invention contains the component (A) to component (C) at a specified ratio.

The method of producing the curable composition for a polymer electrolyte of the present invention may be according to an ordinary method, and the composition can be produced by mixing the component (A) to component (C) and, if necessary, further mixing the other components therewith, and stirring the resulting mixture according to an ordinary method. In this case, heating or warming can be performed, if necessary.

A method can also be employed which includes dividing the composition of the present invention, except for the component (C), into two or more agents, separately mixing each of the two agents with a respective one of two components that constitute a redox type radical initiator to prepare a first agent and a second agent, and mixing the first agent and the second agent before coating. In this case, curing may be performed by heating or may be also performed at ambient temperature.

The viscosity of the curable composition for a polymer electrolyte of the present invention can be appropriately set by a person skilled in the art, depending on the coating method, in order to obtain a coating surface that is excellent in terms of coatability, namely, smoothness, which is acceptable in a production step of a layered body using a polymer electrolyte.

6. Usage Method

The method of using the curable composition for a polymer electrolyte of the present invention may be according to an ordinary method, and examples thereof include a method including coating a substrate with the composition, then affixing the resultant with another substrate, and performing light irradiation or heating.

The composition of the present invention can be used for mutual adhesion of polymer electrolytes, or adhesion of a polymer electrolyte and various other substrates (hereinafter, referred to as "other substrate"). In other words, the composition can be used for adhesion of two substrates, at least one of which is a polymer electrolyte. Hereinafter, the simple indication "substrate" collectively means a polymer electrolyte and other substrate.

Publically known methods such as a dispenser, screen printing, gravure printing, inkjet, or dipping can be applied to coating onto the substrate.

The coating thickness of the composition of the present invention may be selected depending on the substrate to be used and the application, and is preferably from 1 to 500 µm, and more preferably from 5 to 100 µm.

Specific examples of the polymer electrolyte include a perfluorocarbon material having a sulfonic acid group. Examples of a commercially available product of the polymer electrolyte include Nation (registered trademark) manufactured by DuPont, FLEMION (registered trademark) manufactured by AGC Inc., Aciplex (registered trademark) manufactured by Asahi Kasei Corporation, and GORE-SELECT (registered trademark) membrane manufactured by W L. Gore & Associates GK.

The polymer electrolyte in the present invention may be a polymer electrolyte in which a coating membrane is formed on a surface thereof, or may be a membrane/electrode assembly (MEA) for a fuel cell in which a polymer electrolyte membrane and an electrode are integrated. Examples of a commercially available product of MEA include GORE (registered trademark) PRIMEA (registered trademark) membrane/electrode assembly manufactured by W. L. Gore & Associates GK.

The composition can be favorably used particularly as an adhesive for allowing the membrane/electrode assembly and another substrate to adhere each other, or a sealant between a polymer electrolyte membrane and a gasket.

Examples of the other substrate include a heat-resistant polymer and a metal.

Specific examples of the heat-resistant polymer include a cycloolefin polymer, a polycarbonate, polyethylene naphthalate, a polyimide, a polysulfone, a polyether sulfone, and a polyether ether ketone.

Specific examples of the metal include gold, silver, copper, aluminum, iron, nickel, titanium, stainless steel, and chromium molybdenum steel.

In a case in which the heat-resistant polymer or the like is a hardly adhesive material, a surface thereof may be subjected to an activation treatment before coating the curable composition for a polymer electrolyte of the present invention. Examples of the surface activation treatment include a plasma treatment, a corona discharge treatment, a chemical treatment, a roughening treatment, an etching treatment, and a flame treatment, and these treatments may be used in combination.

In a case in which the composition of the present invention is a photocurable composition containing the component (c1), the composition may be cured by coating the substrate therewith, then affixing materials for adhesion, and irradiating the resultant with light through a transparent substrate such as, for example, a polymer electrolyte.

Examples of a light source in this case include a high-pressure mercury lamp, a metal halide lamp, and a LED which radiates ultraviolet rays or short-wavelength visible light. Use of the photocurable composition is preferable because a production time can be shortened.

The dose of irradiation of ultraviolet rays may be appropriately set depending on the type of the composition and the light source, and is, for example, preferably from 50 to 5,000 mJ/cm$^2$ and more preferably from 100 to 3,000 mJ/cm$^2$ in an UV-A region (in the vicinity of 365 nm) or UV-V region (in the vicinity of 405 nm).

In a case in which both substrates are opaque, the composition is preferably a thermosetting composition containing the component (c2).

In this case, the composition may be cured by heating, for example, at a temperature range of from 60 to 250° C., and for example, in a duration of from some sec to some 10 min.

7. Layered Body and Production Method Thereof

The layered body of the present invention is a layered body including a polymer electrolyte as a substrate. The layered body is a layered body configured to include a substrate, a cured product that is formed from the composition, and another substrate, in which at least one of the substrate or the other substrate is a polymer electrolyte.

The polymer electrolyte is preferably a perfluorocarbon material having a sulfonic acid group, from the viewpoint that the material is chemically stable.

Specific examples of the method of producing the layered body include a method that includes coating the composition onto a substrate, affixing another substrate with the coating surface, and irradiating the resultant with light from a side of either the substrate or the other substrate.

The method of coating the composition, the thickness of the composition, light irradiation conditions, and the like are as described above.

Examples of the application of the resulting layered body include a solid polymer fuel cell, an actuator that is used for medical use or the like, and various sensors such as a medical sensor or a gas sensor.

EXAMPLES

Hereinafter, the present invention will be more specifically described with reference to Examples and Comparative Examples. However, the present invention is not limited to these Examples.

Hereinafter, "part(s)" means part(s) by mass, and a numerical value representing a compounding ratio in each Table is expressed in terms of "% by mass".

1. Production Example

1) Production Example 1 [Production of Component (a1) (Polyurethane Acrylate Having Hydrogenated Polybutadiene Skeleton)]

A 2-L four-necked separable flask was charged with 480 g (0.576 mol in terms of hydroxyl group) of GI-1000 (hydroxyl value 67.2 mgKOH/g, Mn about 1,500) manufactured by NIPPON SODA CO., LTD., as a hydrogenated polybutadiene having a hydroxyl group at each of both terminals, 0.20 g of 2,6-di-t-butyl-p-cresol, and 194 g of isobornyl acrylate (molecular weight 208, hereinafter, referred to as "IBXA"), a stirrer was attached thereto, and the resultant was stirred and mixed to be dissolved. A thermometer, a gas inlet tube, a dropping funnel, and a reflux condenser were attached to the flask, stirring was made with bubbling of a mixed gas of oxygen and nitrogen (oxygen 5%), and the temperature was raised to 50° C. After 0.01 g of NACEM Iron (III) as a catalyst was added and dissolved in the solution, 79.9 g (0.72 mol in terms of isocyanate group) of isophorone diisocyanate was added through the dropping funnel. After stirring and mixing at 80° C. for 2 hours, 20.7 g (0.144 mol in terms of hydroxyl group) of 4-hydroxybutyl acrylate (hereinafter, referred to as "4HBA") was added to allow reaction to proceed for 5 hours, disappearance of the isocyanate group was confirmed by an IR spectrum, and production was terminated.

The resulting product was a mixture that includes 75% of polyurethane acrylate (hereinafter, referred to as "PUA-1") having a hydrogenated polybutadiene skeleton, and 25% of IBXA as a dilution monomer. The resulting product was subjected to GPC measurement, and the molecular weight of PUA-1 was determined from a peak corresponding to PUA-1, as a result of which the Mn was 10,659 and the weight average molecular weight (hereinafter, referred to as "Mw") was 28,248.

2) Production Example 2 [Production of Macromonomer as Raw Material of Component (D)]

A glass reaction vessel equipped with a stirrer, a reflux condenser, a thermometer, a nitrogen inlet tube, and a connecting portion for a liquid-feeding pipe was charged with 200 parts of ion-exchange water. While stirring and blowing of nitrogen gas were performed, the inner temperature of the reactor was adjusted to 80° C. The glass vessel to which a liquid-feeding pipe was attached was charged, by a metering pump, with 36.35 parts of methyl methacrylate (hereinafter, referred to as "MMA"), 36.35 parts of isobutyl methacrylate (hereinafter, referred to as "IBMA"), 20 parts of methacrylic acid, and 7.3 parts of 2-ethylhexyl thioglycolate, and the resultant was stirred to prepare a monomer mixture liquid (100 parts). After the inner temperature was confirmed to be stabilized at 80° C. an initiator aqueous solution in which 0.8 parts of ammonium persulfate as an initiator was dissolved in 3.0 parts of ion-exchange water was added to the reactor, and after 5 minutes, feeding of the monomer mixture liquid to the reactor was initiated. The metering pump was used to feed 100 parts of the monomer mixture liquid to the reactor at a constant rate over 240 minutes. After completion of the feeding, the inner temperature of the reactor was raised to 90° C. over 30 minutes and maintained for 5 hours after the start of the temperature rise, whereby a prepolymer dispersion was obtained. After the sampled prepolymer dispersion was dried, the molecular weight was measured by GPC, and the Mn and the Mw were 2,700 and 4,600 in terms of polystyrene, respectively.

The prepolymer dispersion obtained above was subjected to temperature drop over 30 minutes to achieve an inner temperature of 80° C., blowing of nitrogen gas was replaced with blowing of air, and 0.03 parts of methoxyhydroquinone was added immediately. After 5 minutes from the addition of methoxyhydroquinone, 9.4 parts of triethylamine was fed to the reactor at a constant rate over 30 minutes. After 15 minutes, 6.1 parts of glycidyl methacrylate (hereinafter, referred to as "GMA") was fed to the reactor at a constant rate over 30 minutes and heated at an inner temperature of 80° C. for 3 hours, thereby allowing GMA to be added to a carboxyl group of the prepolymer, and thus a macromonomer composition dispersion (hereinafter, referred to as "MM-1", NV 34%) was obtained.

3) Production Example 3 [Production of Component (D) (Crosslinked Acrylic Fine Particles)]

A glass reaction vessel equipped with a stirrer, a reflux condenser, a thermometer, a nitrogen inlet tube, and a connecting portion for a liquid-feeding pipe was charged with 100.4 parts of ion-exchange water, 475.6 parts of methanol, 0.12 parts of 25% ammonia, water, 5.86 parts of the macromonomer composition dispersion (MM-1), 15.0 parts of MMA, 50.0 parts of IBMA, and 10.0 parts of 2-ethylhexyl acrylate. While stirring, and blowing of nitrogen gas were performed, the inner temperature of the reactor was adjusted to 55° C.

After the inner temperature was confirmed to be stabilized at 55° C., 25.0 parts of trimethoxysilylpropyl methacrylate was added to the reactor. After 10 minutes, 2.4 parts of a 70% solution of t-butylperoxy pivalate (trade name "PERBUTYL PV" manufactured by NOF CORPORATION) as an initiator was added thereto and polymerization was initiated. After addition of a catalyst, the reaction liquid was immediately clouded, and gradually whitened and turned to opaque white, and it was confirmed that polymer fine particles were produced. After 6 hours from addition of PERBUTYL PV the inner temperature was kept at 55° C., and a dispersion of polymer fine particles having a hydrolyzable silyl group was thus obtained.

Subsequently, 32.8 parts of 25% ammonia water as a basic catalyst for crosslinking the hydrolyzable silyl group was added, the inner temperature was raised to 62° C. and kept for 3 hours, and the particles were thus crosslinked. Note that 1.0 part of an antioxidant (trade name "Irganox 245" manufactured by BASF SE) was added at 2.5 hours after addition of the ammonia water.

The reaction liquid was cooled, and then taken out with filtration by 200-mesh PolyNet, and the collected fine particle dispersion was dried at 60° C. until the non-volatile content at the time of heating at 155° C. for 30 minutes reached 98% by mass or more. After the drying, crushing was performed and a product (hereinafter, referred to as "fine particle-1") as a polymer fine particle powder was obtained.

The volume average primary particle size of the resulting fine particle-1 was measured with a laser diffraction scattering particle size distribution meter [MT3000II manufactured by Nikkiso Co., Ltd.] (wet method), and as a result, was found to be 2.3 μm.

4) Production Example 4 [Production of Acrylic Polymer Having Epoxy Group]

The jacket temperature of a pressure stirring tank type reactor that is equipped with an oil jacket and has a volume of 1000 mL was kept at 187° C. Next, while the pressure in the reactor was kept constant, a monomer mixture including butyl acrylate (50 parts), GMA (50 parts), methyl ethyl ketone (18 parts) as a polymerization solvent, and di-t-butyl peroxide (0.25 parts) as a polymerization initiator was initiated to be continuously fed at a constant feed rate (48 g/min, residence time: 12 minutes) from a feedstock tank to the reactor, and a reaction liquid of which amount corresponded to the feed amount of the monomer mixture was continuously extracted through an outlet. Although the temperature rise due to polymerization heat was observed after the reaction temperature was once dropped immediately after the initiation of the reaction, the inner temperature of the reactor was kept from 189 to 191° C. by control of the oil jacket temperature.

The time point after 36 minutes from stabilization of the inner temperature of the reactor was defined as the starting point of collection of the reaction liquid, the reaction was continued for 25 minutes after the starting point, and as a result, 1.2 kg of the monomer mixture liquid was fed and 1.2 kg of the reaction liquid was collected.

Thereafter, the reaction liquid was introduced into a thin-film evaporator, thereby separating and removing the volatile component such as an unreacted monomer, and a liquid acrylic polymer (hereinafter, referred to as "BAGMA") having an epoxy group was thus obtained. The molecular weight was measured by GPC, and the Mn and the Mw were found to be 3,460 and 9,700 in terms of polystyrene, respectively. The Tg (DSC measurement, at a rate of temperature rise of 10° C./min) was −10° C., and the viscosity at 80° C. was 12,200 mPa·s.

5) Production Example 5 [Production of Component (a1) (Polyurethane Acrylate Having Hydrogenated Polybutadiene Skeleton]

Production was carried out in the same amounts by the same operations as in Production Example 1, except that IBXA of Production Example 1 was changed to an acrylate (ARONIX M-111 manufactured by TOAGOSEI CO., LTD., molecular weight 318, hereinafter, referred to as "M-111") of an ethylene oxide adduct (1 mol (average) adduct) of nonylphenol.

The resulting product was a mixture including 75% of PUA-1, and 25% of M-111 as a dilution monomer.

2. Example 1 to Example 9 and Comparative Example 1 to Comparative Example 9

1) Preparation of Curable Composition

Each curable composition was prepared by compounding each component at each rate shown in Table 1 to Table 4, and stirring and mixing the resultant according to an ordinary method. The composition was, as needed, heated to about 80° C. in preparation. In a case in which fine particles were compounded, compounding and dispersing them were performed at the end.

Each number of parts of PUA-1 in the Tables represents the number of parts of only the polyurethane acrylate component included in the product of Production Example 1 or Production Example 5. Each number of parts of IBXA includes the number of parts of IBXA included in the product of Production Example 1, and represents, in the case of adding IBXA, the total number of parts of IBXA included in the product of Production Example 1 and parts of IBXA added later. Each number of parts of M-111 represents the total number of parts of M-111 included in the product of Production Example 5 and parts of M-111 added later.

The resulting curable compositions of Table 1 to Table 4 were used and evaluated as described below. These results are shown in Table 1 to Table 4.

The number with respect to each component in Table 1 to Table 4 is expressed in terms of "% by mass", and means the content of each component based on the entire composition. Note that each number indicated in parentheses means each content of the component (a1) to component (a5) based on the entire component (A) and is determined by rounding off in calculation of each content of the component (a1) to component (a5), and thus the total amount of the contents in parentheses is not 100 in some cases.

Abbreviations in Table 1 to Table 4 each mean the following.

<Component (A)>
Component (a1)
PUA-1: polyurethane acrylate included in the product of Production Example 1 or Production Example 5
Component (a2)
4HBA: 4-HBA (4-hydroxybutyl acrylate) (molecular weight 144) manufactured by OSAKA ORGANIC CHEMICAL INDUSTRY LTD.
Component (a3)
IBXA: IBXA (isobornyl acrylate) (molecular weight 208) manufactured by OSAKA ORGANIC CHEMICAL INDUSTRY LID.
MEDOL: MEDOL-10 ((2-methyl-2-ethyl-1,3-dioxolan-4-yl)methyl acrylate) (molecular weight 208) manufactured by OSAKA ORGANIC CHEMICAL INDUSTRY LID.
M-111: ARONIX M-111 manufactured by TOAGOSEI CO., LTD. (acrylate of ethylene oxide adduct (1 mol (average) adduct) of nonylphenol) (molecular weight 318)
Component (a4)
LA: LA (lauryl acrylate) (molecular weight 240) manufactured by OSAKA ORGANIC CHEMICAL INDUSTRY LTD.
Component (a5)
V #190: VISCOAT #190 (ethyl carbitol acrylate) (molecular weight 188) manufactured by OSAKA ORGANIC CHEMICAL INDUSTRY LID.
<Component (B)>
JP-100: NISSO-PB JP-100 (epoxidized polybutadiene, oxirane oxygen concentration 7.8%, Mn about 1,200) manufactured by NIPPON SODA CO., LTD.
<Component (C)>
Component (c1)
Irg-819: photoradical polymerization initiator, Irgacure 819 (bis(2,4,6-trimethylbenzoyl)-phenylphosphine oxide) manufactured by BASF SE
TPO: photoradical polymerization initiator, Irgacure TPO (2,4,6-trimethylbenzoyl-diphenyl-phosphine oxide) manufactured by BASF SE
<Other components>
Component (D)
Fine particle-1: crosslinked acrylic fine particles obtained in Production Example 3 Antioxidant
Erg-101.0: Irganox 1010 (pentaerythritol tetrakis[3-(3,5-di-tert-butyl-4-hydroxyphenyl)propionate]) manufactured by BASF SE
<Compound having Epoxy Group Different from Component (B)>
SR-16HL: SR-16HL (1,6-hexanediol diglycidyl ether) manufactured by Sakamoto Yakuhin kogyo Co., Ltd.
JER-828: jER-8 bisphenol A type epoxy resin) manufactured by Mitsubishi Chemical Corporation
N-665: EPICLON N-665 (cresol-novolac type epoxy resin) manufactured by DIC
BAGMA: acrylic polymer having epoxy group, obtained in Production Example 4
<Liquid Polybutadiene Different from Component (B)>
B-1000: NISSO-PB B-1000 (liquid polybutadiene having no epoxy group, Mn about 1,200) manufactured by NIPPON SODA CO., LTD.
G-1000: NISSO-PB G-1000 (liquid polybutadiene having no epoxy group and having hydroxyl group at each of both terminals, Mn about 1,400) manufactured by NIPPON SODA CO., LTD.

2) Evaluation of Adhesiveness

Nation (registered trademark) NRE-212 (thickness 0.002 inches) manufactured by DuPont [hereinafter, referred to as "Nafion"] was used as a polymer electrolyte membrane, and was cut into a width of 20 mm and a length of 60 mm.

A cycloolefin polymer [trade name ZEONOR (registered trademark) ZF-14, manufactured by LEON CORPORATION, hereinafter, referred to as "ZEONOR"] having a thickness of 100 μm was used as another substrate, cut into a width of 40 mm and a length of 70 mm, and subjected to a corona treatment as an easy adhesion treatment. The corona treatment was carried out under conditions of use of POLYDYNE 1 from Navitas Co., Ltd., 15.6 kV, a treatment width of 100 mm, 0.12 kW and a treatment rate of 50 mm/sec.

The corona-treated surface was coated with each composition shown in Table 1 to Table 4, at a thickness of 30 μm by a bar coater. Lamination was performed by a hand roller so that the coated surface was located at a side of Nation, and thereafter the resultant was irradiated with ultraviolet rays from a side of ZEONOR, whereby the composition was cured. The irradiation with ultraviolet rays was carried out under conditions of use of a conveyor-type ultraviolet irradiation apparatus (metal halide lamp, semi-light concentration system, conveyor speed 12.5 m/min, peak intensity of illumination 1,600 mW/cm$^2$ (UV-A), cumulative amount of light per pass 750 mJ/cm$^2$ (UV-A)) manufactured by EYE GRAPHICS CO., LTD., and the number of passes of 2 (1,500 mJ/cm$^2$ in total). The illuminometer here used was UV POWER PUCK manufactured by EIT.

The resulting adhesion material was cut into a width of 10 mm at a portion in which Nafion was present, and was conditioned under conditions of 23° C. and a relative humidity of 50% for 24 hours. Thereafter, the ZEONOR side was affixed to a stainless plate by a double-faced tape, Nafion was peeled, the peeled tip was allowed to adhere to another film by a cellophane tape, thereby extending the length of the test piece, and a 180-degree peeling test (peeling distance of from 5 to 10 mm) was performed at a tensile speed of 10 mm/min, whereby the adhesiveness was evaluated. These results are shown in Table 1 to Table 4.

3) Evaluation of Hot Water Immersion Resistance

After the peeling test of 2.2), the peeled portion was cut off, thereby obtaining a test piece having a width of 10 mm and a length of 30 mm. The test piece was immersed in ion-exchange water and kept at 95° C., and presence of peeling and area of pealed portion were visually observed after one day and after four days, and evaluated according to the following criteria. These results are shown in Table 1 to Table 4.

A: after four days, a peeled portion was not observed or was slightly observed, and was less than 1% with respect to the whole.

B: after four days, 1% or more but less than 10% of peeling was observed.

C: after four days, 10% or more but less than 30% of peeling was observed.

D: after four days, 30% or more but less than 50% of peeling was observed.

E: after four days, 50% or more of peeling was observed.

F: after one day, 50% or more of peeling was observed.

TABLE 1

|  |  |  |  | Example 1 | Example 2 | Example 3 | Example 4 | Example 5 |
|---|---|---|---|---|---|---|---|---|
| Curable composition | (A) | (a1) | PUA-1 | 49.5 (57.6) | 49.5 (57.6) | 49.5 (57.6) | 49.5 (57.6) | 49.5 (57.6) |
|  |  | (a2) | 4HBA | 10 (11.6) | 10 (11.6) | 10 (11.6) | 10 (11.6) |  |
|  |  | (a3) | IBXA | 16.5 (19.2) | 26.5 (30.8) | 16.5 (19.2) | 16.5 (19.2) | 26.5 (30.8) |
|  |  |  | MEDOL |  |  | 10 (11.6) |  |  |
|  |  |  | M-111 |  |  |  |  |  |
|  |  | (a4) | LA | 10 (11.6) |  |  |  | 10 (11.6) |
|  |  | (a5) | V#190 |  |  |  | 10 (11.6) |  |
|  | (B) |  | JP-100 | 10 | 10 | 10 | 10 | 10 |
|  | (C) | (c1) | Irg-819 | 1.9 | 1.9 | 1.9 | 1.9 | 1.9 |
|  |  |  | TPO | 1.9 | 1.9 | 1.9 | 1.9 | 1.9 |
|  | Other component | (D) | Fine particle-1 |  |  |  |  |  |
|  |  | Antioxidant | Irg-1010 | 0.2 | 0.2 | 0.2 | 0.2 | 0.2 |
|  |  | Total amount |  | 100 | 100 | 100 | 100 | 100 |
| Evaluation results | Adhesiveness (N/cm) |  |  | 2.1 | 4.6 | Unpeelable | 4.8 | 2.4 |
|  | Hot water immersion resistance |  |  | A | A | A | A | A |

TABLE 2

|  |  |  |  | Example 6 | Example 7 | Example 8 | Example 9 |
|---|---|---|---|---|---|---|---|
| Curable composition | (A) | (a1) | PUA-1 | 42 (55.3) | 49.5 (57.6) | 24 (42.9) | 20 (35.7) |
|  |  | (a2) | 4HBA | 10 (13.2) | 20 (23.3) | 6 (10.7) |  |
|  |  | (a3) | IBXA | 14 (18.4) | 16.5 (19.2) | 26 (46.4) |  |
|  |  |  | MEDOL |  |  |  |  |
|  |  |  | M-111 |  |  |  | 36 (64.3) |
|  |  | (a4) | LA | 10 (13.2) |  |  |  |
|  |  | (a5) | V#190 |  |  |  |  |
|  | (B) |  | JP-100 | 20 | 10 | 6 | 6 |
|  | (C) | (c1) | Irg-819 | 1.9 | 1.9 | 1.2 | 1.2 |
|  |  |  | TPO | 1.9 | 1.9 | 1.2 | 1.2 |
|  | Other component | (D) | Fine particle-1 |  |  | 35.4 | 35.4 |
|  |  | Antioxidant | Irg-1010 | 0.2 | 0.2 | 0.2 | 0.2 |
|  |  | Total amount |  | 100 | 100 | 100 | 100 |
| Evaluation results | Adhesiveness (N/cm) |  |  | 2.8 | 2.5 | Unpeelable | 2.2 |
|  | Hot water immersion resistance |  |  | A | C | A | A |

TABLE 3

|  |  |  |  | Comparative Example 1 | Comparative Example 2 | Comparative Example 3 | Comparative Example 4 | Comparative Example 5 |
|---|---|---|---|---|---|---|---|---|
| Curable composition |  | (a1) | PUA-1 | 49.5 (51.6) | 57 (59.4) | 49.5 (57.6) | 49.5 (57.6) | 49.5 (57.6) |
|  |  | (a2) | 4HBA | 10 (10.4) | 10 (10.4) | 10 (11.6) | 10 (11.6) | 10 (11.6) |
|  | (A) | (a3) | IBXA | 16.5 (17.2) | 19 (19.8) | 16.5 (19.2) | 16.5 (19.2) | 16.5 (19.2) |
|  |  |  | MEDOL |  |  |  |  |  |
|  |  | (a4) | LA | 20 (20.8) | 10 (10.4) | 10 (11.6) | 10 (11.6) | 10 (11.6) |
|  | (B) |  | JP-100 |  |  |  |  |  |
|  | (C) | (c1) | Irg-819 | 1.9 | 1.9 | 1.9 | 1.9 | 1.9 |
|  |  |  | TPO | 1.9 | 1.9 | 1.9 | 1.9 | 1.9 |
|  |  | Antioxidant | Irg-1010 | 0.2 | 0.2 | 0.2 | 0.2 | 0.2 |
|  |  |  | SR-16HL |  |  | 10 |  |  |
|  | Other component | Epoxy compound | JER-828 |  |  |  | 10 |  |
|  |  |  | N-665 |  |  |  |  | 10 |
|  |  |  | BAGMA |  |  |  |  |  |
|  |  | Polybutadiene | B-1000 |  |  |  |  |  |
|  |  |  | G-1000 |  |  |  |  |  |
|  |  | Total amount |  | 100 | 100 | 100 | 100 | 100 |
| Evaluation results | Adhesiveness (N/cm) |  |  | 2.3 | 3.3 | 1.5 | 0.7 | 1.9 |
|  | Hot water immersion resistance |  |  | E | E | F | F | F |

TABLE 4

| | | | | Comparative Example 6 | Comparative Example 7 | Comparative Example 8 | Comparative Example 9 |
|---|---|---|---|---|---|---|---|
| Curable composition | (A) | (a1) | PUA-1 | 49.5 (57.6) | 49.5 (57.6) | 49.5 (57.6) | 30 (60.0) |
| | | (a2) | 4HBA | 10 (11.6) | 10 (11.6) | 10 (11.6) | 10 (20.0) |
| | | (a3) | IBXA | 16.5 (19.2) | 16.5 (19.2) | 16.5 (19.2) | 10 (20.0) |
| | | | MEDOL | | | | |
| | | (a4) | LA | 10 (11.6) | 10 (11.6) | 10 (11.6) | |
| | (B) | | JP-100 | | | | 46 |
| | (C) | (c1) | Irg-819 | 1.9 | 1.9 | 1.9 | 1.9 |
| | | | TPO | 1.9 | 1.9 | 1.9 | 1.9 |
| | Other component | Antioxidant | Irg-1010 | 0.2 | 0.2 | 0.2 | 0.2 |
| | | Epoxy compound | SR-16HL | | | | |
| | | | JER-828 | | | | |
| | | | N-665 | | | | |
| | | | BAGMA | 10 | | | |
| | | Polybutadiene | B-1000 | | 10 | | |
| | | | G-1000 | | | 10 | |
| | Total amount | | | 100 | 100 | 100 | 100 |
| Evaluation results | Adhesiveness (N/cm) | | | 2.2 | 2.7 | 2.6 | 0.6 |
| | Hot water immersion resistance | | | F | E | E | F |

4) Evaluation Results

As clear from the results in Examples 1 to 9, in the case of using the curable composition for a polymer electrolyte of the present invention, the polymer electrolyte membrane and ZEONOR were able to adhere to each other in a short time, the adhesiveness before hot water immersion was as favorable as 2 N/cm or more in each case, and hot water immersion resistance was also favorable.

Among these, Example 1 to Example 6, Example 8, and Example 9, in which the content of the component (a2) in the component (A) was 20% by mass or less, were particularly excellent in terms of hot water immersion resistance. Example 2 to Example 4 and Example 8, in which the component (A) included the component (a2) in an amount of from 1 to 20% by mass and the component (a3) in an amount of from 5 to 70% by mass, and did not include 10% by mass or more of the component (a4), were also excellent in terms of adhesiveness before the hot water immersion test.

Comparative Examples 1 to 8, in which no component (B) was included, were significantly deteriorated in terms of hot water immersion resistance. Comparative Example 9, in which the content of JP-100 serving as the component (B) exceeded the range in the present invention, was considerably inferior in terms of hot water immersion resistance as is the case with Comparative Example 3 to Comparative Example 6, and was also low in terms of adhesiveness before the hot water immersion test.

Comparative Example 1, in which the JP-100 serving as the component (B) of Example 1 was replaced with an increase in the amount of LA, and Comparative Example 2, in which the JP-100 of Example 1 was replaced with increases in the amounts of PUA-1 and IBXA, were significantly deteriorated in terms of hot water immersion resistance, although they were favorable in terms of adhesiveness before the hot water immersion test.

Comparative Example 3 to Comparative Example 6, in which the JP-100 of Example 1 was replaced with an epoxy compound other than the component (B), were further significantly deteriorated in terms of hot water immersion resistance. Comparative Example 7 and Comparative Example 8, in which the JP-100 (epoxidized polybutadiene) of Example 1 was replaced with a polybutadiene having no epoxy group, were inferior in terms of hot water immersion resistance as is the case with Comparative Example 1 and Comparative Example 2.

INDUSTRIAL APPLICABILITY

The curable composition for a polymer electrolyte of the present invention is excellent in terms of adhesiveness to a polymer electrolyte, also excellent in terms of adhesiveness to another substrate such as a heat-resistant polymer, and also excellent in terms of hot water immersion resistance. Thus, the curable composition is particularly favorable as an adhesive for allowing a membrane/electrode assembly for a solid polymer fuel cell to adhere to another substrate in a short time. The curable composition is also favorable as a sealant between a polymer electrolyte membrane for a fuel cell and a gasket. The curable composition is also favorable as an adhesive for actuators or various sensors, which are for medical use or the like and which use a polymer electrolyte.

What is claimed is:

1. A curable composition for a polymer electrolyte, comprising:
   a component (A): a radical polymerizable compound having a (meth)acryloyl group,
   a component (B): a compound having, in one molecule, an epoxy group and a skeleton of at least one selected from the group consisting of polybutadiene, polyisoprene, hydrogenated polybutadiene, and hydrogenated polyisoprene, and
   a component (C): a radical polymerization initiator,
   wherein a content of each of the components (A) to (C) based on the entire composition is as follows,
       the component (A): from 30 to 98.9% by mass
       the component (B): from 1 to 40% by mass, and
       the component (C): from 0.1 to 15% by mass,
   wherein the component (A) comprises a component (a1): a compound having, in one molecule, a (meth)acryloyl group and a skeleton of at least one selected from the group consisting of polybutadiene, polyisoprene, hydrogenated polybutadiene, and hydrogenated polyisoprene,
   wherein a content of the component (a1) based on the entire component (A) is from 20 to 100% by mass, and
   wherein the component (a1) comprises the compound having a urethane bond in the molecule.

2. The curable composition for a polymer electrolyte according to claim 1, wherein:

the component (A) comprises a component (a2): a compound having a hydroxyl group and one (meth)acryloyl group, and a content of the component (a2) based on the entire component (A) is 20% by mass or less.

3. The curable composition for a polymer electrolyte according to claim 2, wherein:

the component (A) further comprises a component (a3): a compound having a ring structure and one (meth)acryloyl group, provided that the component (a3) is not the component (a2), and a content of each of the components (a1) to (a3) based on the entire component (A) is as follows,
the component (a1): from 20 to 94% by mass
the component (a2): from 1 to 20% by mass, and
the component (a3): from 5 to 70% by mass.

4. The curable composition for a polymer electrolyte according to claim 1, wherein the component (C) comprises a component (c1): a photoradical polymerization initiator.

5. The curable composition for a polymer electrolyte according to claim 1, further comprising a component (D): fine particles having a volume average primary particle size of from 0.1 to 100 µm, as measured by a wet method, wherein a content of the component (D) based on the entire composition is from 1 to 60% by mass.

6. The curable composition for a polymer electrolyte according to claim 5, wherein the component (D) comprises polymer fine particles.

7. The curable composition for a polymer electrolyte according to claim 1, the curable composition being used as an adhesive or sealant for a fuel cell.

8. A layered body comprising a substrate, a cured product that is formed from the curable composition for a polymer electrolyte according to claim 1, and another substrate, wherein at least one of the substrate or the other substrate is a polymer electrolyte.

9. The curable composition for a polymer electrolyte according to claim 1, wherein a molecular weight of the component (a1) is from 3,000 Mn to 80,000 Mn.

10. The curable composition for a polymer electrolyte according to claim 1, wherein:

the component (A) comprises a component (a2): a compound having a hydroxyl group and one (meth)acryloyl group;

a content of the component (a2) based on the entire component (A) is 20% by mass or less;

the component (A) further comprises a component (a3): a compound having a ring structure and one (meth)acryloyl group, provided that the component (a3) is not the component (a2); and a content of each of the components (a1) to (a3) based on the entire component (A) is as follows,
the component (a1): from 20 to 94% by mass
the component (a2): from 1 to 20% by mass, and
the component (a3): from 5 to 70% by mass.

\* \* \* \* \*